United States Patent [19]

Melocik

[11] 4,114,047
[45] Sep. 12, 1978

[54] CONTROL APPARATUS
[75] Inventor: Grant C. Melocik, Chardon, Ohio
[73] Assignee: Towmotor Corporation, Mentor, Ohio
[21] Appl. No.: 813,030
[22] Filed: Jul. 5, 1977
[51] Int. Cl.² ............................................... H02G 3/00
[52] U.S. Cl. ...................................... 307/9; 180/82 R; 307/328; 361/205
[58] Field of Search .................. 361/1, 205; 307/10 R, 307/9, 112, 113, 114, 115, 326, 327, 328; 180/101, 82 R

[56] References Cited
U.S. PATENT DOCUMENTS

| | | | |
|---|---|---|---|
| 2,492,077 | 12/1949 | Wall | 307/10 R |
| 3,507,350 | 4/1970 | Boyajian | 180/101 |

Primary Examiner—Robert K. Schaefer
Assistant Examiner—Morris Ginsburg
Attorney, Agent, or Firm—John L. James

[57] ABSTRACT

Control apparatus includes a power supply, a switch and first and second apparatus for connecting the switch to the power supply. The first apparatus is changeable between a first operating condition at which power flows from the power supply to the switch and a second operating condition at which power flow from the power supply is blocked. The second apparatus changes the first apparatus from the first operating condition to the second operating condition. The control apparatus includes apparatus for energizing the second apparatus in response to the switch being open.

17 Claims, 3 Drawing Figures

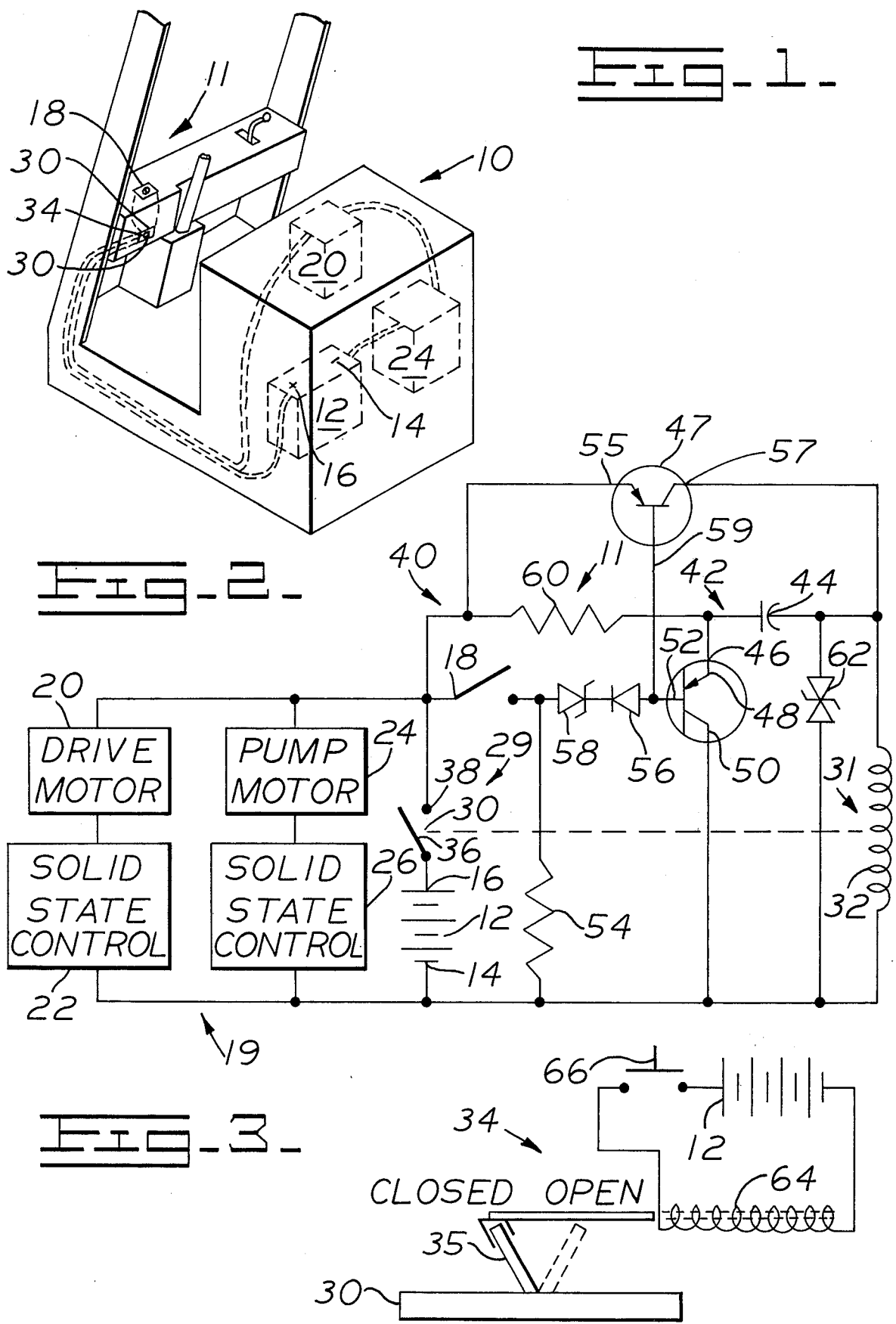

CONTROL APPARATUS

BACKGROUND OF THE INVENTION

Current vehicles, particularly electric lift trucks, have electric drive motors and solid state control devices for controlling movement of the vehicle. Circuit breakers are used to limit current flow to the motors and solid state devices and a switch is used to turn the vehicle on or off. Current can sometimes flow after the vehicle is turned off, which can cause damage to the vehicle and to the solid state control devices. It is desirable to have a control system which interrupts current flow to the motors and solid state devices when the vehicle is turned off. It is also desirable to have a system which prevents inadvertent starting of the vehicle.

SUMMARY OF THE INVENTION

The present invention is directed to overcoming one or more of the problems as set forth above.

According to the present invention, control apparatus comprises a power supply and a switch movable between an open position and a closed position. The control apparatus includes first means for connecting the switch to the power supply and second means for changing the first means from a first operating condition to a second operating condition. In the first condition power flows from the power supply to the switch and in the second condition power flow from the power supply is blocked. The control apparatus includes means for controllably energizing the second means and urging the first means from the first operating condition to the second operating condition only in response to the switch being in the open position.

BRIEF DESCRIPTION OF THE DRAWINGS

FIG. 1 is an isometric view of a lift truck;

FIG. 2 is a partial schematic illustration of the control apparatus of the present invention; and FIG. 3 is a partial schematic illustration of the present invention.

DETAILED DESCRIPTION

Referring to FIGS. 1 and 2, a vehicle 10, such as a lift truck for example, preferably has control apparatus 11 which includes a direct current power supply 12 with an input 14 and an output 16 and a switch 18, preferably a key switch, which is movable between an open position and a closed position. The lift truck 10 has apparatus such as movement controls 19 which include a drive motor 20 with a solid state electronic control unit 22 and a pump motor 24 with a solid state electronic control unit 26. Other apparatus can be connected to the power supply.

The control apparatus 11 includes first means 29, preferably a circuit breaker 30, and second means 31, preferably a circuit breaker trip coil 32. The first means 29 connects the key switch 18 to the power supply output 16 and is changeable between first and second operating conditions. Power flows from the power supply output 16 to the key switch 18 at the first condition and power flow from power supply 12 is blocked at the second condition. The first means 29 is changeable from the first condition to the second condition in response to power flow of a preselected magnitude through the first means 29. The second means 31 changes the first means 29 from the first operating condition to the second operating condition.

The circuit breaker 30 is connected to the power supply 12 in series with the key switch 18 and the movement controls 19. The circuit breaker 30 has a resetting means 34 and at least first and second current carrying contactors 36, 38. The first contactor 36 is connected to the power supply output 16 and the second contactor 38 is connected to the key switch 18 and movement controls 19.

The contactors 36, 38 are movable, one relative to the other, between a first position at which the contactors 36, 38 abut each other and form a path for current flow and a second position at which the contactors 36, 38 are spaced a preselected distance one from the other and interrupt the path for current flow.

The resetting means 34 includes a lever 35 which is, preferably, manually operated and has a construction sufficient for moving the contactors 36, 38 between the first and second positions. The contactors 36, 38 automatically move from the first position to the second position in response to current flow of a preselected magnitude through the contactors 36, 38.

The trip coil 32 has a construction sufficient for moving the contactors from the first position to the second position. The circuit breaker 30 and key switch 18 are mounted in close proximity on the lift truck 10 and are easily accessible to an operator.

The control apparatus 11 includes a means 40 for controllably energizing the trip coil 32 and urging the contactors 36, 38 from the first position to the second position only in response to the key switch 18 being in the open position. The key switch 18 must be placed in the closed position and the circuit breaker 30 must be manually reset before the movement controls 19 can be operated. The control means 40 is connected to the trip coil 32 and to the second contactor 38 of the circuit breaker 30.

The control means 40 includes means 42 for directing current through the trip coil 32 in a preselected direction. The means 42 preferably includes a capacitor 44 connected to the trip coil 32 and coupled to the power supply output 16, and transistors 46, 47. The capacitor 44 has a capacity sufficient for energizing the trip coil 32 and tripping the circuit breaker 30.

The first transistor 46 has an emitter 48 connected to the capacitor 44 and coupled to the power supply output 16, a collector 50 connected to the power supply input 14 and to the trip coil 32 in opposed relation to the capacitor 44, and a base 52 coupled to the key switch 18 in opposed relation to the second contactor 38 of the circuit breaker 30.

The first transistor 46 is biased by a biasing means, preferably a biasing resistor 54, coupled to the base 52 and connected to the power supply input 14. The transistor 46 is protected from power supply transient voltages and currents preferably by a blocking diode 56 connected to the base 52 and coupled to the biasing resistor 54 so that current flows only from the base 52 to the biasing resistor 54.

The second transistor 47 has an emitter 55 connected to the second contactor 38 of the circuit breaker 30, a collector 57 connected to the trip coil 32 and capacitor 44, and a base 59 connected to the base 52 of the first transistor 46.

The transistor 46 is protected from energizing the trip coil 32 because of a drop of power supply voltage, preferably by a zener diode 58. The zener diode 58 is connected in series with the blocking diode 56 and connected to the biasing resistor 54 in opposed relation to the power supply input 14 and the key switch 18 in opposed relation to the circuit breaker 30. The cathodes of the diodes 56, 58 are connected one to the other.

A limiting means, preferably a resistor 60, limits voltage and current surges caused by fluctuation of the power supply output 16, and protects the trip coil 32. The surge resistor 60 is connected to the second contactor 38 of the circuit breaker 30 and to the capacitor 44 and transistor 46. The value of the surge resistor 60 is sufficient for limiting voltage and current surges to a preselected maximum value less than the value required to energize the trip coil 32 and trip the circuit breaker 30.

The control means 40 provides a means, preferably a varistor 62, for controllably collapsing an electromagnetic field about the trip coil 32 in response to discharging the capacitor 44. The varistor 62 is connected in parallel with the trip coil 32 and provides a path for current to flow when the electromagnetic field collapses and includes current flow in the trip coil 32.

Referring to FIGS. 1 and 3, the circuit breaker 30 can be mounted on the lift truck 10 near the power supply 12 and remotely located from the key switch 18. The circuit breaker 30 can be remotely reset by a solenoid 64 of the resetting means 34 which is connected to the power supply 12 in series with a reset switch 66. The solenoid 64 has a construction sufficient for moving the lever 35 and moving the contactors 36, 38 from the second position to the first position. The reset switch 66 is preferably depressed and held for a preselected duration to energize the solenoid 64 and reset the circuit breaker 30. The reset switch 66 is preferably mounted on the lift truck 10 in close proximity to the key switch 18 and easily accessible to an operator.

One skilled in the art can readily calculate appropriate values for the components once the output voltage of the power supply is known. In the present invention, each of the transistors is preferably an MPS-U56, the zener diode 58 is a 1N5248, the diode 56 is a 1N4005, and the varistor 62 is a V68ZA2.

In operation, an operator first closes the key switch 18 then closes the circuit breaker 30 by operating the lever 35. Current flows to the movement controls 19 and through the surge resistor 60 and charges the capacitor 44. Current flows from the capacitor 44 through the varistor 62 and the trip coil 32 with the surge resistor 60 limiting the amount. When the capacitor 44 is fully charged, current flow to the varistor 62 and the trip coil 32 ceases.

The first transistor 46 is off when the key switch 18 and circuit breaker 30 are closed and turns on when the key switch 18 is opened. The capacitor 44 discharges through the transistor 46 and energizes the trip coil 32 which trips the circuit breaker 30. If the circuit breaker 30 is reset before the key switch is closed, the second transistor 47 conducts, and the trip coil 32 energizes.

Thus when the key switch 18 is open, no current flows to the movement controls 19 and the vehicle 10 cannot be operated without resetting the circuit breaker 30. When the circuit breaker 30 trips, no power flows from the power supply 12.

Other aspects, objects and advantages will become apparent from a study of the specification, drawing and appended claims.

The Embodiment of the invention in which an exclusive property or privilege is claimed are defined as follows:

1. Control apparatus, comprising:

a power supply having an input and an output;
   a switch movable between an open position and closed position;
   first means for connecting said switch to said power supply output, said first means being changeable between first and second operating conditions, power flowing from the power supply output to the switch at the first operating condition and power flow from the power supply being blocked at the second operating condition, said first means being changeable from the first operating condition to the second operating condition in response to power flow of a preselected magnitude through said first means;
   second means for changing said first means from the first operating condition to the second operating condition; and
   means for automatically, controllably energizing said second means and urging the first means from the first operating condition to the second operating condition only in response to said switch being in the open position.

2. An apparatus, as set forth in claim 1, wherein the control means comprises
   means for directing current through said second means in a preselected direction.

3. An apparatus, as set forth in claim 2, including means for limiting the magnitude of voltage and current surges to said second means.

4. An apparatus, as set forth in claim 3, wherein said limiting means includes a resistor connected to said switch, and said first and second means.

5. An apparatus, as set forth in claim 2, wherein said current directing means includes a transistor having an emitter connected to said first means and a collector connected to said second means.

6. An apparatus, as set forth in claim 2, wherein said current directing means includes
   a capacitor connected to said second means and said output of said power supply;
   a transistor having an emitter connected to said capacitor and said power supply output, a collector connected to said second means in opposed relation to said capacitor and to said power supply input, and a base connected to said switch in opposed relation to said first means; and
   means for biasing said transistor.

7. An apparatus, as set forth in claim 6, wherein said biasing means includes a resistor connected to said transistor base and said power supply input.

8. An apparatus, as set forth in claim 7, including a zener diode connected to said resistor and switch and a second diode connected to said transistor base and said zener diode, said diodes being connected one to the other in series.

9. An apparatus, as set forth in claim 6, wherein said second means includes a trip coil and including means for controllably collapsing an electromagnetic field about said trip coil in response to discharging said capacitor.

10. An apparatus, as set forth in claim 9, wherein said collapsing means includes a varistor connected to said capacitor and said power supply input in parallel with said trip coil.

11. An apparatus, as set forth in claim 1, including resetting means for changing the first means from the second operating condition to the first operating condition.

12. An apparatus, as set forth in claim 11, including a reset switch connected to said power supply and a solenoid connected to said power supply in series with said reset switch, said solenoid being of a construction sufficient for controllably moving a lever of said resetting means and changing said first means from the second operating condition to the first operating condition.

13. An apparatus, as set forth in claim 11 wherein said resetting means is positioned in close proximity to said switch.

14. An apparatus, as set forth in claim 11, wherein the resetting means includes a manually actuated member.

15. An apparatus, as set forth in claim 1, including means for controlling movement of a vehicle, said means being connected to said power supply output only when said first means is in the first condition.

16. An apparatus, as set forth in claim 1, wherein the first means is a circuit breaker and the second means is a circuit breaker trip coil.

17. An apparatus, as set forth in claim 1, including elements connected to the power supply output, said elements, switch and control apparatus being removed from connection to the power supply output in response to the first means changing from the first operating condition to the second operating condition.

* * * * *